March 19, 1963  D. S. MUTTI  3,081,573
FISHING LURE
Filed Jan. 15, 1960

INVENTOR
DANIEL S. MUTTI
BY John P. Phillips
ATTORNEY

United States Patent Office 3,081,573
Patented Mar. 19, 1963

3,081,573
FISHING LURE
Daniel S. Mutti, Rte. 1, Box 13, McGregor, Minn.
Filed Jan. 15, 1960, Ser. No. 2,647
4 Claims. (Cl. 43—42.24)

This invention relates to fishing lures.

An important object of the invention is to eliminate the usual hooks and to embody such hooks as a part of the lure itself.

A further object is to provide such a lure formed of a body of sheet material having hooks formed integral therewith and extending from the faces thereof, thus eliminating the use of the usual hooks attached to devices of this character.

A further object is to provide a novel lure of this type wherein the hooks are formed as a part of the sheet metal body and are struck therefrom to extend on opposite sides thereof to engage in the mouth of the fish.

A further object is to provide such a device wherein the hooks lie wholly within the limits of the longitudinal edges of the lure whereby the device, when a fish is caught, may be removed from the gills of the fish after disconnecting the swivel associated with the lead line.

A further object is to provide a novel type of lure formed of a single sheet of material having tongues formed by cutting slots in the longitudinal edges of the body and then bending the tongues in opposite directions to form hooks.

A further object is to provide a lure of the type just referred to having novel rubber tubing or similar means associated therewith for preventing the flesh of a fish's mouth from becoming jammed in the slots which are cut to form the hooks.

A further object is to provide such a device having novel formations associated therewith for causing the lure to wobble or rotate as it passes through the water.

Other objects and advantages of the invention will become apparent during the course of the following description.

In the drawing I have shown two embodiments of the invention. In this showing:

Figure 1:
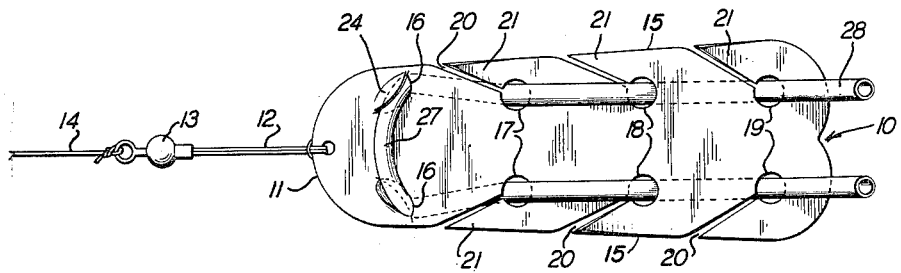
FIGURE 1 is a face view of one form of lure.

Referring to FIGURE 1, the numeral 10 designates the body of the lure formed of a single sheet of material of substantial strength, for example, stainless steel. The forward end 11 of the body may be curved as shown and connected by a leader 12 and swivel 13 with a line 14, the swivel 13 or some other element associated with the line being detachable for a purpose to be described.

Figure 2:
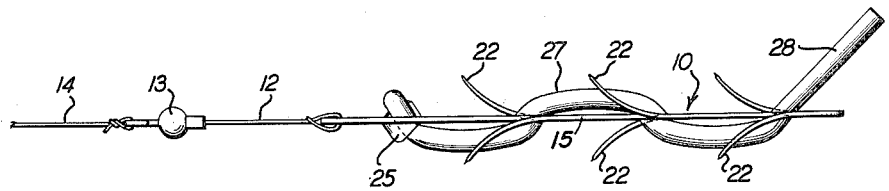
FIGURE 2 is an edge elevation of the same.

In the form of the invention shown in FIGURES 1 and 2, the body 10 has straight longitudinal edges 15 and is punched to provide pairs of preferably circular openings 16, 17, 18 and 19, and from each of the openings 17, 18 and 19 the body is angularly slotted as at 20 to form tongues 21. After these slots have been cut, the tongues 21 have their pointed forward ends turned outwardly to form hooks 22 (FIGURE 2) to catch in a fish's mouth.

In forming the openings 16, the material is not completely punched out as is true of the openings 17, 18 and 19. The material at one of the openings 16 is bent from the adjacent face of the body 10 as at 24, while the material from the other opening 16 is bent from the opposite face of the lure as at 25 (FIGURE 2). The elements 24 and 25 form small blades which tend to cause the lure to rotate in the water.

In forming the slots 20 and hooks 22, there is a tendency in catching a fish for the flesh of the fish's mouth to jam in the inner ends of the slots 20. To avoid this, and for another purpose, a rubber tube 27 or similar device has its ends respectively threaded through the successive openings 16, 17, 18 and 19 at the sides of the device, the rear ends of the tube projecting upwardly at an angle, as at 28 (FIGURE 2).

Figure 3:
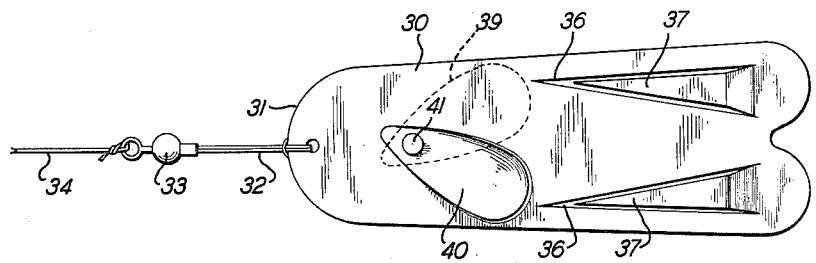
FIGURE 3 is a face view of a modified type of lure.
Figure 4:
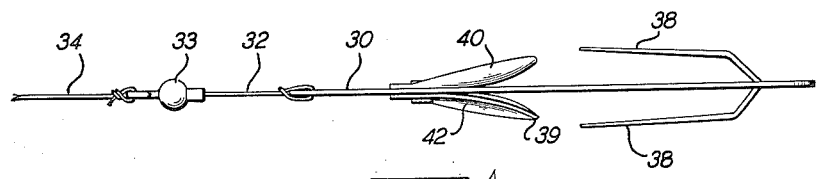
FIGURE 4 is an edge elevation thereof.

In the modified form of the invention shown in FIGURES 3 and 4, the body 30 of the lure also is formed of suitable relatively stiff and strong material such as stainless steel, the body having a rounded forward end 31 connected successively to a leader 32, swivel 33 and line 34. The swivel in this case also is detachable, or some other detachable device is connected in the line for a purpose to be described.

Toward the rear thereof, the body is punched, as at 36, along angular lines to form tongues 37 which are offset in opposite directions from the plane of the body to form pointed hooks 38 (FIGURE 4). The body 30 may be solid from the forward end thereof to the forward ends of the punched openings 36. To opposite sides of such solid body portion is fixed a pair of blades 39 and 40 having narrow forward ends secured together through the body 30 by a friction rivet 41. The two blades 39 and 40 are preferably adjusted to diverge rearwardly as shown in FIGURE 3. Each blade also diverges laterally from the adjacent face of the body 30, and each blade as its outer face dished as at 42.

*Operation*

It will be noted that each form of the invention embodies hooks as a part of the body thereof, the usual fish hooks connected to the rear end of the lure being omitted. In the form of the invention shown in FIGURES 1 and 2, the rubber tube 27 is not essential to the operation of the device, but its use is preferred. The free ends of the tube are threaded through the respective openings 16 and then woven rearwardly through the openings of the successive pairs 17, 18 and 19, the rear ends 28 of the tube naturally assuming the angular position shown at 28 in FIGURE 2.

In using the device, the lure is pulled through the water in the usual manner, and it may be trolled at any depth by the suitable connection of sinkers at any point ahead of the lure. If a fish seizes the lure from the rear thereof, two or more of the hooks 22 will catch in the fish's mouth, and the device is removed from the fish by disconnecting the swivel 13 or other disconnectible means, whereupon the lure may be withdrawn through one of the gills of the fish. As stated, the two elements 24 and 25 form oppositely extending angular lips, and as the device is pulled through the water, these lips tend to cause the device to rotate as it passes through the water. The lips 24 and 25 may be omitted, in which case it has been found in practice that the device will wobble in its movement through the water to attract the attention of the fish.

The rubber tube 27 serves two purposes. In the first place, it tends to close off in a cushioning manner the inner ends of the slots 20, thus minimizing the chance that flesh within the fish's mouth will become jammed within the slots 20. In the second place, the tube, as will be obvious in FIGURE 2, disturbs the smooth continuity of the body of the device and thus tends more effectively to attract the fish as the device wobbles or rotates in its passage through the water. Such attractiveness is enhanced by the angularly extending tube ends 28 which, being formed of soft rubber, partake of a waving action as the device passes through the water, thus presenting the appearance of live bait.

It will be noted in FIGURE 1 that the hook elements do not extend beyond the longitudinal edges of the bait. Such absence of transverse protuberances greatly facilitates the withdrawing of the bait through the fish's gills. This action also is not interfered with by the projecting tube ends 28 since these ends are soft and readily bend over the body of the device if it is withdrawn. The withdrawing action may be performed by grasping the rear end of the device with a pair of pliers.

The form of the device shown in FIGURES 3 and 4 is used in the manner previously described. Two of the hooks 38 have been shown, but additional hooks formed in the body of the material may be employed. These hooks, extending laterally of the surfaces of the body 30, break up the smooth continuity of the body, as is true of the hooks 22, and the same is true of the blades 39 and 40. Moreover, these blades are dished and inclined oppositely away from the surfaces of the body and diverge rearwardly as in FIGURE 3, serving to cause the lure to rotate as it passes through the water, thus additionally serving to attract the attention of the fish. The device shown in FIGURES 3 and 4 also is withdrawn from the gills of the fish in the manner previously described.

It is to be understood that the forms of the invention shown and described are to be taken as preferred examples of the same and that various changes in the shape, size, and arrangement of the parts may be made as do not depart from the spirit of the invention or the scope of the appended claims.

I claim:
1. A fishing lure comprising a relatively flat elongated body of stiff sheet material substantially flat throughout the greater portion of its area, such portion of the area of said body having relatively straight longitudinal edges and having a forward end adapted for connection with a leader, said body having longitudinal edge portions provided with rearwardly converging slots to form portions of said sheet as forwardly pointed flash-piercing tongues, said tongues being offset from opposite faces of the sheet of material to form hooks.

2. A fishing lure comprising a relatively flat body of stiff sheet material having a forward end adapted for connection with a leader, said body having longitudinal edge portions provided with rearwardly converging slots to form portions of said sheet as forwardly pointed tongues, said tongues being offset from opposite faces of the sheet of material to form hooks, said body being provided at the inner ends of said slots with openings communicating with said slots, and an elongated relatively soft element having portions threaded through said openings at opposite sides of said body.

3. A fishing lure comprising a relatively flat body of stiff sheet material having a forward end adapted for connection with a leader, said body having longitudinal edge portions provided with rearwardly converging slots to form portions of said sheet as forwardly pointed tongues, said tongues being offset from opposite faces of the sheet of material to form hooks, said body being provided at the inner ends of said slots with openings communicating with said slots, and an elongated relatively soft element having portions threaded through said openings at opposite sides of said body, said body forward of the forwardmost openings being provided adjacent opposite sides thereof with a pair of openings, said element intermediate its ends having a loop extending across said body and passing through said pair of openings, said element having rear free ends projecting rearwardly from said body.

4. A fishing lure according to claim 3 wherein the material adjacent said pair of openings extends respectively from opposite faces of said body to form small blades engageable with the water as the lure is drawn therethrough to effect rotation of the lure.

References Cited in the file of this patent
UNITED STATES PATENTS

| | | |
|---|---|---|
| 632,554 | Dukes | Sept. 5, 1899 |
| 1,925,197 | Maynard | Sept. 5, 1933 |
| 2,334,613 | Dunkelberger | Nov. 16, 1943 |
| 2,345,197 | Hirsch | Mar. 28, 1944 |
| 2,590,167 | Fasano | Mar. 25, 1952 |
| 2,617,228 | Fasano | Nov. 11, 1952 |

FOREIGN PATENTS

| | | |
|---|---|---|
| 67,129 | Norway | Nov. 29, 1943 |